US005886315A

United States Patent [19]

Lu et al.

[11] Patent Number: 5,886,315

[45] Date of Patent: Mar. 23, 1999

[54] BLOW FORWARD CONTACT START PLASMA ARC TORCH WITH DISTRIBUTED NOZZLE SUPPORT

[75] Inventors: Zhipeng Lu, Hanover; Jon Lindsay, West Lebanon; Stephen T. Eickhoff; Michael F. Kornprobst, both of Hanover, all of N.H.

[73] Assignee: Hypertherm, Inc., Hanover, N.H.

[21] Appl. No.: 904,694

[22] Filed: Aug. 1, 1997

[51] Int. Cl.[6] ..................................................... B23K 10/00

[52] U.S. Cl. ................. 219/121.57; 219/75; 219/121.39; 219/121.52; 219/124.01

[58] Field of Search ......................... 219/121.54, 121.57, 219/124.01, 121.5, 121.52, 121.39, 121.59, 121.44, 75

[56] References Cited

U.S. PATENT DOCUMENTS

| | | | |
|---|---|---|---|
| 4,521,666 | 6/1985 | Severance, Jr. et al. | 219/121.59 |
| 4,567,346 | 1/1986 | Marhic | 219/121.48 |
| 4,590,334 | 5/1986 | Marhic et al. | 219/121 PM |
| 4,650,956 | 3/1987 | Marhic et al. | 219/121 PY |
| 4,959,520 | 9/1990 | Okada et al. | 219/121.48 |
| 5,083,005 | 1/1992 | Degrihgny | 219/121.52 |

OTHER PUBLICATIONS

*Powermax 800 High Performance Portable Plasma Cutting System catalog;* Hypertherm, Inc.; 4 pages,; (1995).

*Powermax 800 Torch Parts catalog;* Hypertherm, Inc.; 4 pages (Oct. 1995).

*Primary Examiner*—Mark H. Paschall

*Attorney, Agent, or Firm*—Testa, Hurwitz & Thibeault, LLP

[57] ABSTRACT

A translatable nozzle is supported in a contact start plasma arc torch at an aft end by a swirl ring and at a longitudinally spaced forward end by an insulative bearing member of a nozzle retainer. The nozzle is biased into contact with an electrode by a compliant spring element. A pilot arc is formed by first passing current through the electrode and nozzle. Upon pressurization of a plasma chamber formed therebetween, the nozzle is translated forward, compressing the spring element and initiating the pilot arc. The spring element may be maintained integrally with the nozzle to facilitate removal and replacement of the spring element with the consumable nozzle.

21 Claims, 10 Drawing Sheets

BLOW FORWARD CONTACT START PLASMA ARC TORCH WITH DISTRIBUTED NOZZLE SUPPORT

TECHNICAL FIELD

The present invention relates to plasma arc torches and methods of operation, and more specifically, to a plasma arc torch and method using a contact starting system employing an electrode and a resiliently biased, translatable nozzle.

BACKGROUND

Plasma arc torches are widely used for cutting metallic materials. A plasma arc torch generally includes a torch body, an electrode mounted within the body, passages for cooling and arc control fluids, a swirl ring to control the fluid flow patterns, a nozzle with a central exit orifice, electrical connections, and a power supply. The torch produces a plasma arc, which is a constricted ionized jet of a plasma gas with high temperature and high momentum. A shield may also be employed to provide a shield gas flow to the area proximate the plasma arc. Gases used in the torch can be non-reactive (e.g. argon or nitrogen), or reactive (e.g. oxygen or air).

In operation, a pilot arc is first generated between the electrode (cathode) and the nozzle (anode). The pilot arc ionizes gas passing through the nozzle exit orifice. As the ionized gas reduces the electrical resistance between the electrode and the workpiece, the arc transfers from the nozzle to the workpiece. The torch may be operated in this transferred plasma arc mode, which is characterized by the conductive flow of ionized gas from the electrode to the workpiece, for the cutting of the workpiece.

Generally, there are two widely used techniques for generating a pilot plasma arc. One technique uses a high frequency, high voltage ("HFHV") signal coupled to a DC power supply and the torch. The HFHV signal is typically provided by a generator associated with the power supply. The HFHV signal induces a spark discharge in the plasma gas flowing between the electrode and the nozzle, and this discharge provides a current path. The pilot arc is formed between the electrode and the nozzle with the voltage existing across them.

The other technique for generating a pilot plasma arc is known as contact starting. Contact starting is advantageous because it does not require high frequency equipment and, therefore, is less expensive and does not generate electromagnetic interference. In one form of contact starting, the electrode is manually placed into physical and electrical contact with the workpiece. A current is then passed through the electrode to the workpiece and the arc is struck by manually retracting the electrode from the workpiece.

Improvements in plasma arc torch systems have been developed which have eliminated the need to strike the torch against the workpiece in order to initiate an arc, thereby avoiding damage to brittle torch components. One such system is disclosed in U.S. Pat. No. 4,791,268 ("the '268 patent"), which is assigned to the same assignee as the instant invention. Briefly, the '268 patent describes a torch having a movable electrode initially in contact with a stationary nozzle due to a spring coupled to the electrode such that the nozzle orifice is blocked. To start the torch, current is passed through the electrode and nozzle while a plasma gas is supplied to a plasma chamber defined by the electrode, the nozzle, and a swirl ring. Contact starting is achieved when the buildup of gas pressure in the plasma chamber overcomes the spring force, thereby separating the electrode from the nozzle and drawing a low energy pilot arc therebetween. Thereafter, by bringing the nozzle into close proximity with the workpiece, the arc may be transferred to the workpiece, with control circuitry increasing electrical parameters to provide sufficient energy for processing the workpiece. Plasma arc torch systems manufactured according to this design have enjoyed widespread acceptance in commercial and industrial applications.

During operation of a plasma arc torch, a significant temperature rise occurs in the electrode. In systems which employ a movable electrode, passive conductive cooling of the electrode by adjacent structure is reduced due to the need to maintain sliding fit clearances therebetween. Such clearances reduce heat transfer efficiencies relative to fixed electrode designs employing threaded connections or interference fits. Accordingly, active cooling arrangements have been developed such as those disclosed in U.S. Pat. No. 4,902,871 ("the '871 patent"), which is assigned to the same assignee as the present invention. Briefly, the '871 patent describes an electrode having a spiral gas flow passage circumscribing an enlarged shoulder portion thereof Enhanced heat transfer and extended electrode life are realized due to the increased surface area of the electrode exposed to the cool, accelerated gas flow.

While known contact starting systems function as intended, additional areas for improvement have been identified to address operational requirements. For example, in known contact starting systems, the electrode is supported in part by a spring which maintains intimate electrical and physical contacts between the electrode and nozzle to seal the exit orifice until such time as the pressure in the plasma chamber overcomes the biasing load of the spring. Degradation of the spring due to cyclic mechanical and/or thermal fatigue lead to change of the spring rate or spring failure and, consequently, difficulty in initiating the pilot arc with a concomitant reduction in torch starting reliability. Accordingly, the spring should be replaced periodically; however, due to the location of the spring in the torch body, additional disassembly effort is required over that necessary to replace routine consumables such as the electrode and nozzle. A special test fixture will typically also be needed to assure proper reassembly of the torch. Further, during repair or maintenance of the torch, the spring may become dislodged or lost since the spring is a separate component. Reassembly of the torch body without the spring or with the spring misinstalled may result in difficulty in starting or extended operation of the torch prior to pilot arc initiation.

Additionally, sliding contact portions of the electrode and proximate structure, which may be characterized as a piston/cylinder assembly, may be subject to scoring and binding due to contamination. These surfaces are vulnerable to dust, grease, oil, and other foreign matter common in pressurized gases supplied by air compressors through hoses and associated piping. These contaminants diminish the length of trouble free service of the torch and require periodic disassembly of the torch for cleaning or repair. It would therefore be desirable for moving components and mating surfaces to be routinely and easily replaced before impacting torch starting reliability.

SUMMARY OF THE INVENTION

An improved contact start plasma arc torch and method are disclosed in related U.S. patent application Ser. Nos. 08/727,019 and 08/727,028 which are assigned to the same assignee as the present invention. The apparatus disclosed therein includes a torch body in which an electrode is mounted fixedly. A translatable nozzle is mounted coaxially with the electrode forming a plasma chamber therebetween in cooperation with a swirl ring. The nozzle is resiliently biased into contact with the electrode by a spring element. A nozzle retainer is attached to the torch body to capture and position the nozzle. In one embodiment, a radially outwardly extending flange of the nozzle slidingly engages an annular insulator affixed to an inner wall of the nozzle retainer while a radially aligned inner surface of the nozzle flange slidingly engages the swirl ring.

Several advantages may be realized by employing a translatable nozzle in combination with a fixed electrode. For example, in cutting and marking applications, the invention provides more reliable plasma torch contact starting. In prior art designs employing a movable electrode and fixed nozzle, there are often additional moving parts and mating surfaces such as a plunger and an electrically insulating plunger housing. These parts are installed in the plasma torch and are not designed to be maintained in the field during the service life of the torch, which may be several years. These parts are subject to harsh operating conditions including rapid cycling at temperature extremes and repeated mechanical impact. In addition, in many cases the torch working fluid is compressed air, the quality of which is often poor. Oily mist, condensed moisture, dust, and debris from the air compressor or compressed air delivery line, as well as metal fumes generated from cutting and grease from the operator's hands introduced when changing consumable torch parts all contribute to the contamination of the smooth bearing surfaces permanently installed in the torch. Over time, these contaminants affect the free movement of the parts necessary to assure reliable contact starting of the pilot arc. Part movement becomes sluggish and eventually ceases due to binding, resulting in torch start failures. Many torches fail prematurely due to these uncontrollable variations in field operating conditions. These failures can be directly attributed to the degradation of the surface quality of the relatively moving parts.

One significant advantage of employing a translatable nozzle in combination with a fixed electrode is the use of moving parts and mating surfaces which are routinely replaced as consumable components of the torch. In this manner, critical components of the torch contact starting system are regularly renewed and torch performance is maintained at a high level. Additionally, a high integrity electrical connection with the electrode can be maintained, which is especially important at higher currents associated with operation of the torch in the transferred arc mode.

A translatable nozzle torch also provides enhanced conductive heat transfer from the hot electrode to cool the electrode more efficiently. In prior art contact start systems with a movable electrode, because the electrode must move freely with respect to mating parts, clearance is required between the electrode and proximate structure. This requirement limits the amount of passive heat transfer from the electrode into the proximate structure. In a translatable nozzle torch, the electrode, which is the most highly thermally stressed component of the plasma torch, is securely fastened to adjacent structure which acts as an effective heat sink. The intimate contact greatly reduces interface thermal resistivity and improves electrode conductive cooling efficiency. As a result, the better cooled electrode will generally have a longer service life than a prior art electrode subject to similar operating conditions.

While plasma arc torches manufactured according to the teachings of the related applications, U.S. Ser. Nos. 08/727,017 and 08/727,028, function as intended, improvements have been developed to facilitate manufacture, extend component life, and enhance contact start system reliability.

According to the present invention, an improved contact start plasma arc torch and method of supporting a translatable nozzle are useful in a wide variety of industrial and commercial applications including, but not limited to, cutting and marking of metallic workpieces, as well as plasma spray coating. The apparatus includes a torch body in which an electrode is mounted fixedly. A translatable nozzle is mounted coaxially with the electrode forming a plasma chamber therebetween in cooperation with a swirl ring. A nozzle retainer including a retaining cap, a nozzle bearing, and an outer sleeve is attached to the torch body to capture and position the nozzle. A spring element is disposed between the nozzle retainer and a radially outwardly extending flange of the nozzle to bias the nozzle in a direction of contact with the electrode. An outer shield may be affixed to the nozzle retainer to direct a shield gas flow around the plasma arc.

The translatable nozzle is supported for translation by the combination of the swirl ring and the nozzle bearing. A radially inwardly directed flange of the nozzle bearing slidingly engages a forward wall of the nozzle along an exterior portion thereof and an exterior surface of the swirl ring slidingly engages an aft interior surface of the nozzle. In an alternative embodiment, an interior surface of the swirl ring slidingly engages an aft exterior surface of the nozzle. The nozzle bearing may be manufactured from an electrically insulative material to prevent micro-arcing along sliding contact surfaces, while the retaining cap against which the spring element reacts may be manufactured from an electrically conductive material to provide a current path through the spring element to strike a pilot arc.

In one embodiment, the spring element is attached to the nozzle, forming an integral assembly which is replaced as an assembly. Alternatively, the spring element may be attached to the retaining cap, forming an integral assembly therewith. In another embodiment, the spring element may be a separate component from both the nozzle and the nozzle retainer. The spring element may be any of a variety of configurations including, but not limited to, a wave spring washer, finger spring washer, curved spring washer, helical compression spring, flat wire compression spring, or slotted conical disc.

According to the method of the invention, the translatable nozzle has a generally constant diameter forward outer wall surface portion and a generally constant diameter aft inner wall surface portion. Supporting structures such as a radially inwardly directed flange of the nozzle bearing and an outer wall of the swirl ring slidingly support the nozzle outer and inner wall surface portions respectively, the supporting structures being longitudinally spaced apart. In an alternative embodiment, the translatable nozzle has a generally constant diameter forward outer wall surface portion and a generally constant diameter aft outer wall surface portion. Supporting structures such as a radially inwardly directed flange of the nozzle bearing and an inner wall of the swirl ring slidingly support the nozzle forward and aft outer wall surface portions respectively, the supporting structures being longitudinally spaced apart.

Several advantages may be realized by employing the structure and method according to the invention. For example, by longitudinally spacing the inner and outer supporting structures, nozzle alignment and stability during translation may be improved. Accordingly, jamming or binding due to cocking of the nozzle may be substantially eliminated. Further, the retainer may be manufactured in two pieces, an electrically conductive retaining cap and an overlying electrically insulative bearing, which are joined together by an exterior interlocking mechanical joint instead of by an interior interference fit. As a result, differences in coefficients of thermal expansion may be better accommodated and dimensional stability of the fit between insulative and conductive materials may be improved.

BRIEF DESCRIPTION OF THE DRAWINGS

The invention, in accordance with preferred and exemplary embodiments, together with further advantages thereof, is more particularly described in the following detailed description taken in conjunction with the accompanying drawings in which.

DETAILED DESCRIPTION

Figure 1A:
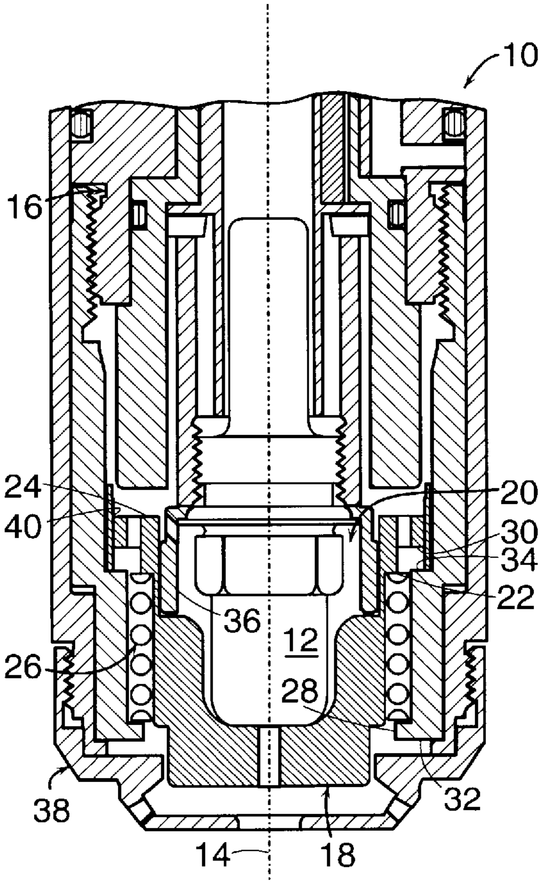
FIG. 1A is a schematic sectional view of a related plasma arc torch working end portion in a de-energized mode.

FIG. 1A depicts a schematic sectional view of a working end portion of a related plasma arc torch 10 in a de-energized mode. The torch 10 includes a nozzle 18 biased into abutting relationship with a centrally disposed electrode 12 by a spring element 26, depicted here as a helical compression spring. The various elements of the torch 10 are disposed generally symmetrically about and colinearly with a longitudinal axis 14 of the torch 10. The nozzle 18 is of unitary construction and includes a longitudinal step 22 on radially outwardly extending flange 24 against which the spring element 26 reacts. The spring element 26 also reacts against a step 28 of the nozzle retainer 32. The nozzle 18 further includes a radially outwardly extending flange 30 radially aligned with a nozzle retainer step 34, the longitudinal clearance therebetween defining the limit of travel of the nozzle 18 when annular plasma chamber 20 is pressurized. The plasma chamber 20 is bounded by the electrode 12, the nozzle 18, and a swirl ring 36. To assemble the torch 10, the nozzle 18 is disposed over the mounted electrode 12 and the swirl ring 36, the spring element 26 is inserted, and the nozzle retainer 32 is attached to the torch body 16 by a threaded connection or other means. The free state length of spring element 26 and assembled location of nozzle retainer step 28 and nozzle step 22 are predetermined to ensure a desired spring element preload at assembly. The torch 10 also includes a gas shield 38 which is installed thereafter for channeling airflow around the nozzle 18 and the plasma arc.

Figure 1B:
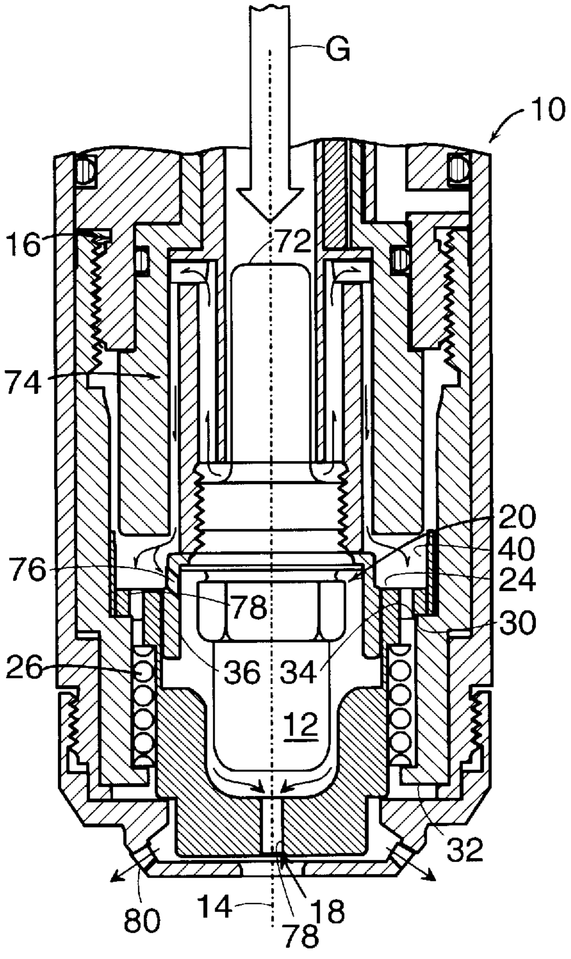
FIG. 1B is a schematic sectional view of the related plasma arc torch working end portion depicted in FIG. 1A in a pilot arc mode.

The torch 10 includes an optional electrical insulator 40 disposed radially between nozzle retainer 32 and nozzle flange 30. The insulator 40 may be affixed to the nozzle retainer 32 by radial interference fit, bonding, or other method. An exemplary material is VESPEL™, available from E.I. du Pont de Nemours & Co., Wilmington, Del. 19898. By providing the insulator 40 between the nozzle flange 30 and the nozzle retainer 32, micro-arcing and associated distress along the sliding surfaces thereof during translation of the nozzle 18 is prevented which otherwise could tend to bind the nozzle 18. To provide a reliable electrical current path through the spring element 26 during pilot arc initiation, a helical metal compression spring with flat ground ends may be employed as depicted. The spring should be made of a non-oxidizing material such as stainless steel and need only support initial current flow between the nozzle 18 and the nozzle retainer 32 during nozzle translation because at full nozzle travel, nozzle flange 30 abuts nozzle retainer step 34 as depicted in FIG. 1B. The torch configuration in the pilot arc state with the plasma chamber 20 pressurized and the nozzle 18 at full travel is depicted in FIG. 1B.

As is apparent from FIGS. 1A and 1B, the nozzle 18 is supported for translation by radially aligned portions of the nozzle retainer 32 and the swirl ring 36. Specifically, the radially outwardly extending nozzle flange 30 slidingly engages the annular insulator 40 affixed to an inner wall of the nozzle retainer 32 while a radially aligned inner surface of the nozzle flange 30 slidingly engages the swirl ring 36.

Figure 2A:
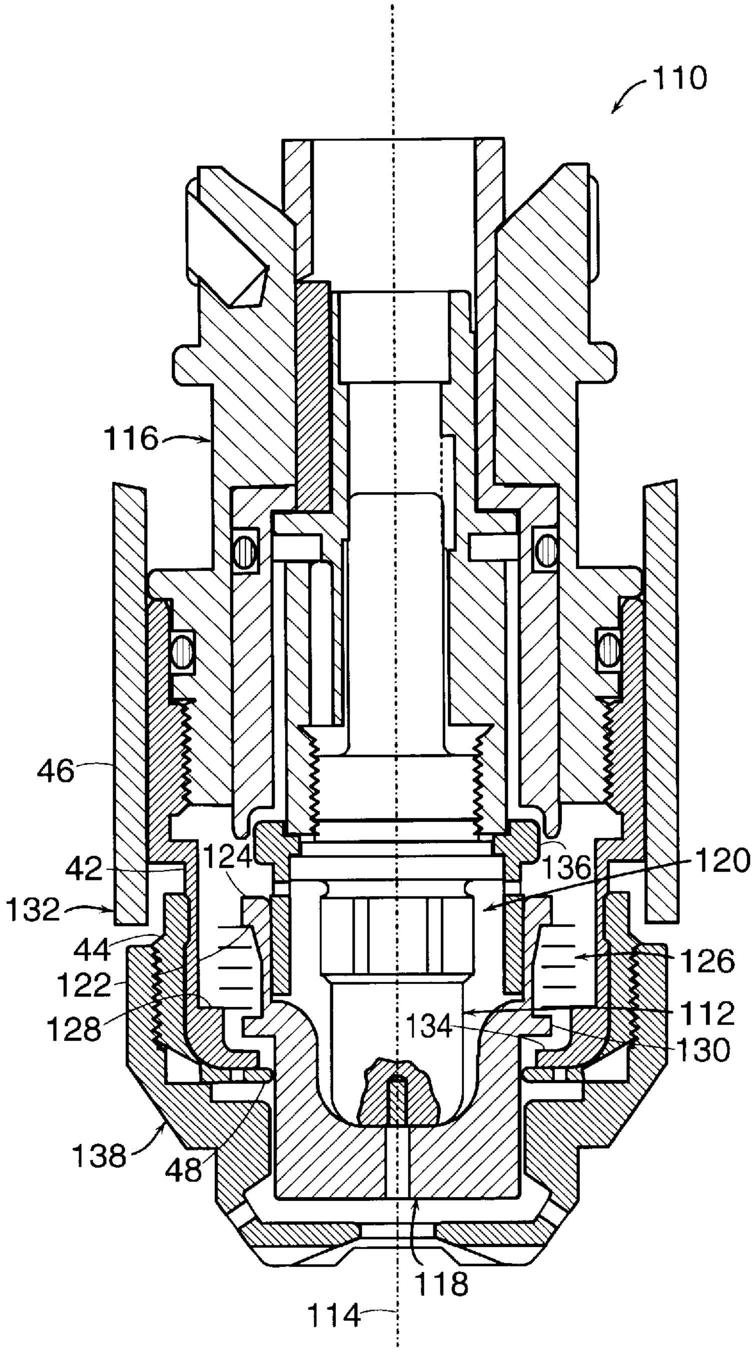
FIG. 2A is a schematic sectional view of a plasma arc torch working end portion depicted in a de-energized mode in accordance with an embodiment of the present invention.

Referring now to FIG. 2A, a schematic sectional view of a working end portion of a plasma arc torch 110 according to the invention is depicted in a de-energized mode. The torch 110 includes a nozzle 118 biased into abutting relationship with a centrally disposed electrode 112 by a spring element 126, depicted here schematically as a series of parallel lines. The various elements of the torch 110 are disposed generally symmetrically about and colinearly with a longitudinal axis 114 of the torch 110. The nozzle 118 may be manufactured of unitary construction or alternatively may include a retainer collar as disclosed in the related applications, U.S. Ser. Nos. 08/727,019 and 08/727,028. The nozzle 118 includes a longitudinal step 122 on radially outwardly extending flange 124 against which the spring element 126 reacts. The spring element 126 also reacts against a step 128 of the nozzle retainer 132. The nozzle retainer 132 is an assembly of a retaining cap 42, a nozzle bearing member 44, and an outer sleeve 46, as will be discussed in greater detail hereinbelow with respect to FIGS. 4A and 4B. Nozzle 118 further includes a radially outwardly extending flange 130 radially aligned with a nozzle retainer step 134, the longitudinal clearance therebetween defining the limit of travel of the nozzle 118 when the annular plasma chamber 120 is pressurized. The plasma chamber 120 is bounded by the electrode 112, the nozzle 118, and a swirl ring 136. To assemble the torch 110, the nozzle 118 is disposed over the mounted electrode 112 and the swirl ring 136. In the embodiment depicted, the spring element 126 is integral with the nozzle 118, being captured between the flanges 124, 130. The nozzle retainer 132 is attached to the torch body 116 by a threaded connection, as depicted, or other suitable means. The free state length of spring element 126 and assembled location of the retainer step 128 and the nozzle step 122 are predetermined to ensure a desired spring element preload at assembly. The torch 110 also includes a gas shield 138 which is installed thereafter for channeling airflow around the nozzle 118 and the plasma arc.

Figure 2B:
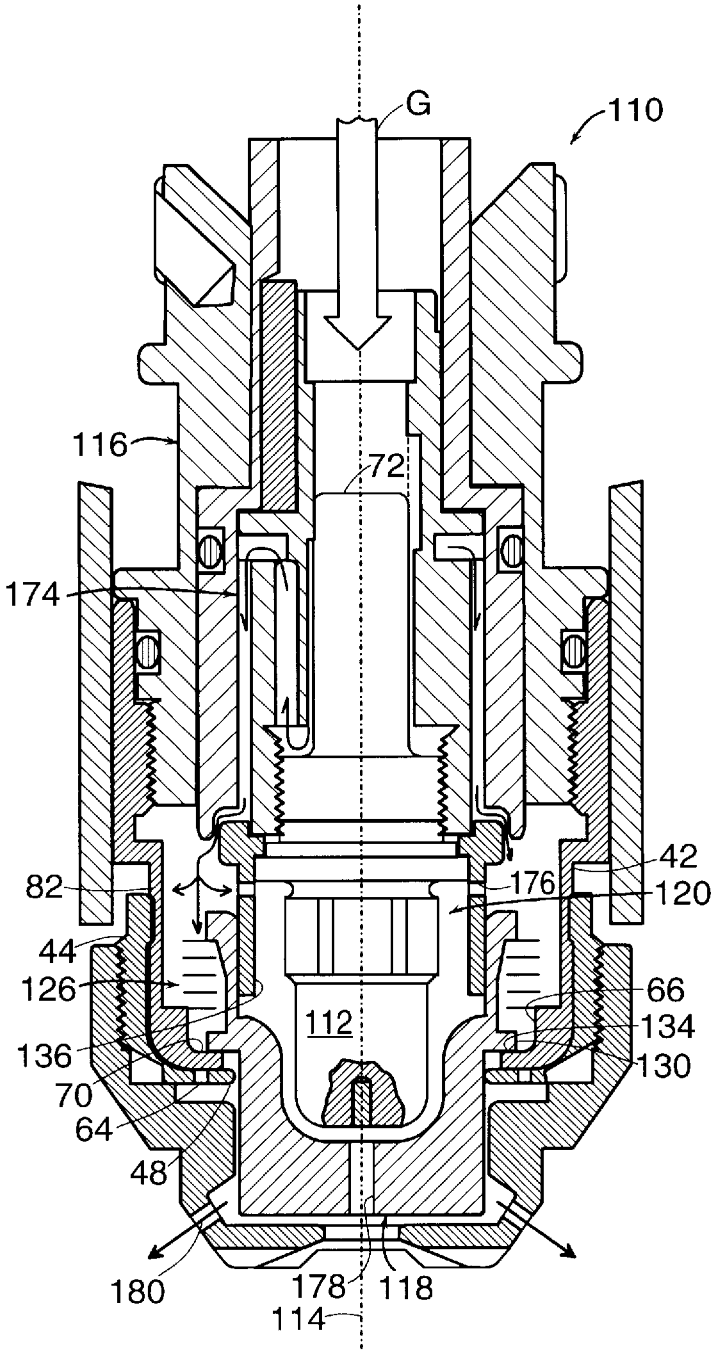
FIG. 2B is a schematic sectional view of the plasma arc torch working end portion depicted in FIG. 2A in a pilot arc mode.

The nozzle bearing member 44 of the nozzle retainer 132 includes a radially inwardly extending flange 48 at a forward end thereof. The flange 48 forms a centrally disposed aperture generally centered along the torch longitudinal axis 114 for radially locating the nozzle 118. The aperture is sized to support a generally constant diameter forward outer wall surface of the nozzle 118 in close fitting, sliding contact relation. The nozzle bearing member 44 may be affixed to the retaining cap 42 by radial interference fit, bonding, or other method. An exemplary material is VESPEL™. By supporting the nozzle 118 at a forward location with an electrically insulative material, micro-arcing and is prevented which otherwise could tend to bind the nozzle 118. To provide a reliable electrical current path through the spring element 126 during pilot arc initiation, one or more wave spring washers or a suitable equivalent may be employed. The spring element 126 should be made of a non-oxidizing material such as stainless steel and need only support initial current flow between the nozzle 118 and the nozzle retainer 132 during nozzle translation because at full nozzle travel, the nozzle flange 130 abuts the step 134 of the retaining cap 42 as depicted in FIG. 2B. The retaining cap 42 may be manufactured from an electrically conductive material such as brass. The torch configuration in the pilot arc state with the plasma chamber 120 pressurized and the nozzle 118 at full travel is depicted in FIG. 2B.

As is apparent from FIGS. 2A and 2B, the nozzle 118 is supported for translation by longitudinally spaced portions of the nozzle retainer 132 and the swirl ring 136. Specifically, the radially inwardly extending bearing member flange 48 slidingly engages the cylindrical outer wall surface of a forward portion of the nozzle 118 while a longitudinally rearwardly disposed swirl ring 136 slidingly engages a generally cylindrical aft inner wall surface of the nozzle 118 proximate nozzle flange 124.

Figure 3A:
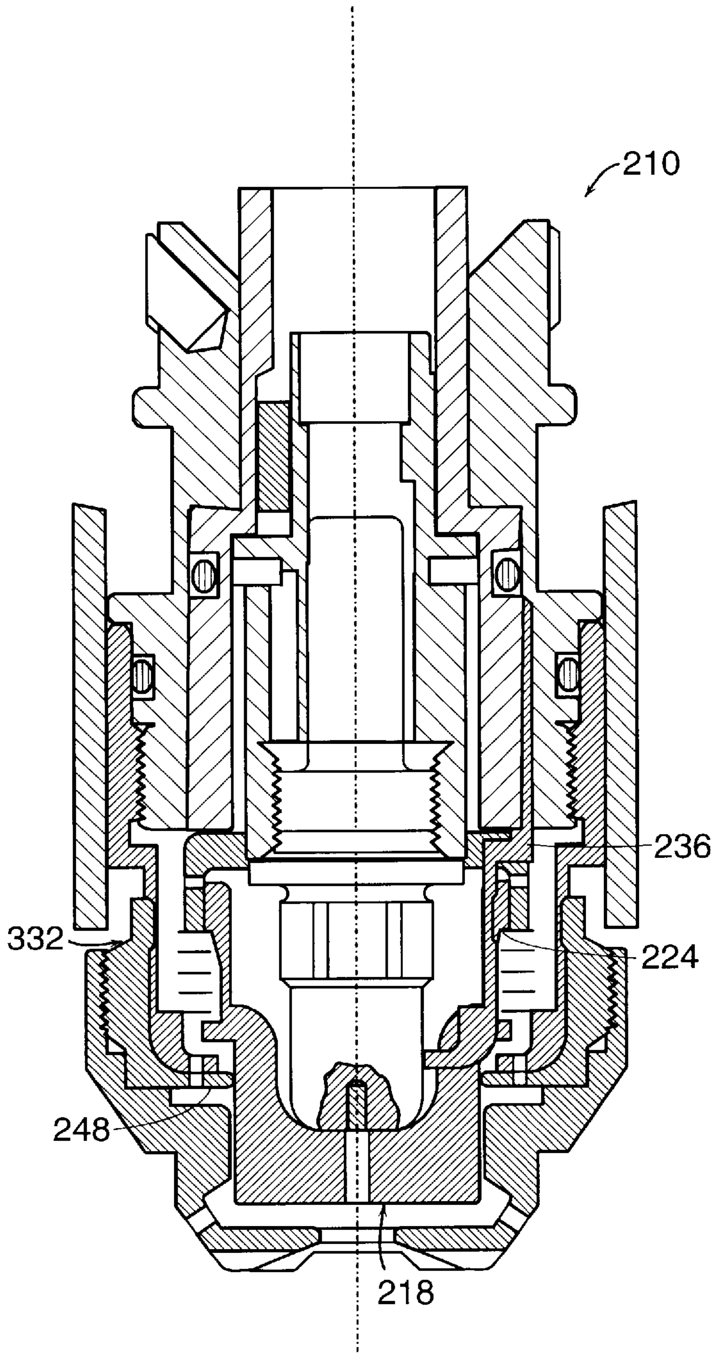
FIG. 3A is a schematic sectional view of a plasma arc torch working end portion depicted in a de-energized mode in accordance with an alternative embodiment of the present invention.
Figure 3B:
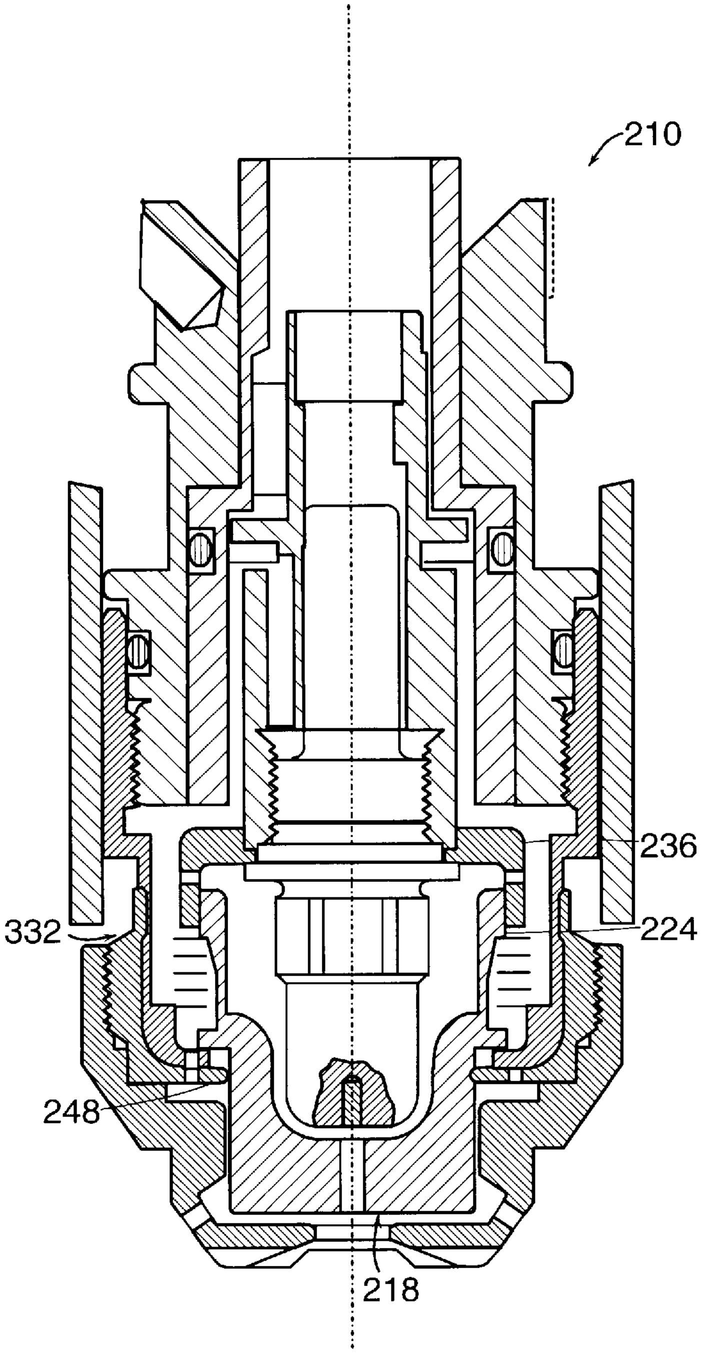
FIG. 3B is a schematic sectional view of the plasma arc torch working end portion depicted in FIG. 3A in a pilot arc mode.

According to an alternative embodiment of the invention, a plasma arc torch 210 is depicted in a de-energized mode and in a pilot arc mode in FIGS. 3A and 3B, respectively. The structure of the torch 210 is similar to the structure of torch 110 with a nozzle 218 of the torch 210 being supported for translation by longitudinally spaced portions of a nozzle retainer 332 and a swirl ring 236. A radially inwardly extending bearing member flange 248 of the nozzle retainer 332 slidingly engages a cylindrical outer wall surface of a forward portion of the nozzle 218 while a longitudinally rearwardly disposed swirl ring 236 slidingly engages a generally cylindrical aft outer wall surface of the nozzle 218 proximate nozzle flange 224.

Figure 4A:
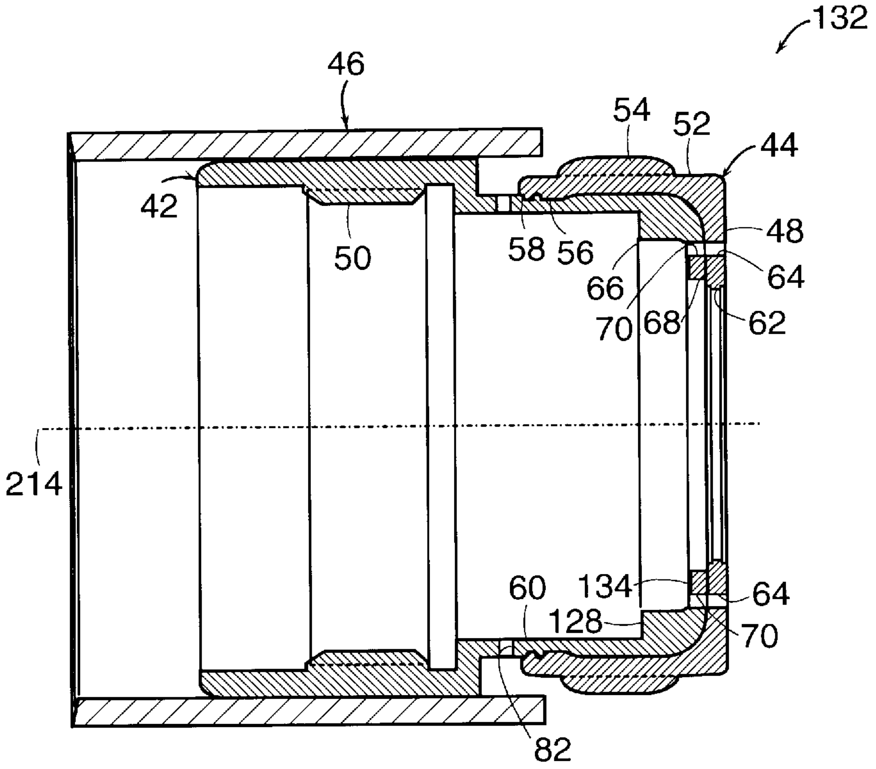
FIG. 4A is a schematic sectional side view of the nozzle retainer depicted in FIG. 2A.
Figure 4B:
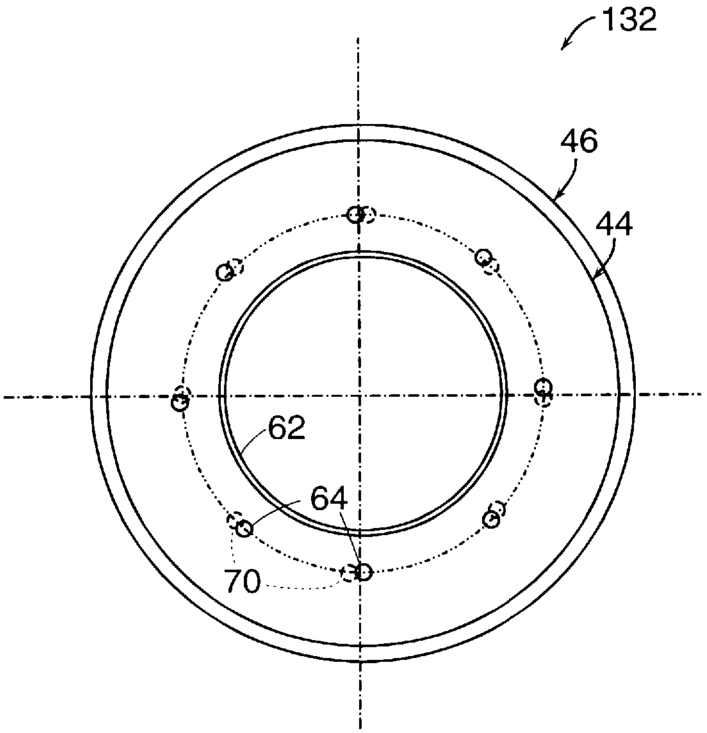
FIG. 4B is a schematic end view of the nozzle retainer depicted in FIG. 4A.

FIGS. 4A and 4B are a schematic sectional side view and a schematic end view, respectively, of the nozzle retainer 132 depicted in FIGS. 2A and 2B. As mentioned hereinabove, the nozzle retainer 132 includes a retaining cap 42, a nozzle bearing member 44, and an outer sleeve 46 forming an assembly. Each of the cap 42, the bearing member 44, and the sleeve 46 have first and second ends defining a longitudinal axis 214 of substantial symmetry which is substantially coincident with torch longitudinal axis 114 when the nozzle retainer 132 is assembled to the torch body 116 along cap threads 50. The bearing member 44 includes a generally cylindrical annular wall 52 having the radially inwardly directed flange 48 extending therefrom. A generous internal radius is provided at the junction of the flange 48 and the wall 52 to provide structural integrity to the bearing member 44. Threads 54 are provided along an exterior portion of the wall 52 for threaded engagement with mating threads of the shield 138 as depicted in FIG. 2A.

While the bearing member 44 could be mounted to the retaining cap 42 by any of a variety of techniques including bonding, threading, press fitting, and the like, an exemplary technique is a contoured radial interference fit. By varying an inner diameter of the wall 52 as a function of position along the longitudinal axis 214, a localized minimum diameter portion 56 can be generated, in this case, at a longitudinal end of the wall 52 remote from the flange 48. Upon pressing the bearing member 44 longitudinally over the retaining cap 42, the bearing member wall 52 is expanded elastically until the minimum diameter portion 56 mates with a matching contoured minimum outer diameter portion 58 of a generally cylindrical annular wall 60 of the retaining cap 42, interlocking the bearing member 44 and the retaining cap 42. To prevent relative rotation between the bearing member 44 and the cap 42 and to enhance the structural integrity of the assembly, the outer diameter of the cap wall 60 may be modified by roughening or knurling, for example, to provide a radial interference fit. The sleeve 46 may be made from an electrically insulative material such as a fiberglass reinforced epoxy and press fit over an aft portion of the retaining cap 42 to provide a grip for threading the nozzle retainer 132 to the torch body 116 and to cover the electrically conductive cap 42 to prevent an electrical shock hazard to a user of the torch 110.

The radial flange 48 of the bearing member 44 forms a first aperture 62 generally centered on the longitudinal axis 214 for radially locating the nozzle 118. In an exemplary embodiment, radial clearance between the nozzle 118 and the flange 48 may be on the order of thousandths of an inch and the contact surface of the flange 48 may have a longitudinal length on the order of thousandths of an inch. The flange 48 may be bounded on forward and aft sides by 45 degree chamfers. Wear debris is effectively ejected from the sliding contact surface, instead of being captured and potentially binding the nozzle 118.

The radial flange 48 also forms a plurality of second apertures 64 radially offset from the nozzle aperture 62 for directing a gas flow to the shield 138 as will be discussed in greater detail hereinbelow. In an exemplary embodiment, eight shield gas apertures 64 of similar diameter are disposed at a substantially constant radius from the longitudinal axis 214 at substantially equi-spaced circumferential locations. Each shield gas aperture 64 defines an aperture axis oriented substantially skew to the longitudinal axis 214. In other words, the shield gas aperture axes are not parallel to nor do they intersect the longitudinal axis 214. As is best seen in FIG. 4B, the shield gas aperture axes are canted in a circumferential direction, inducing a swirling flow in the shield 138. Depending on a particular application, fewer or greater number of shield gas apertures 64 may be formed. In an exemplary embodiment, the shield gas apertures 64 may be on the order of hundredths of inches in diameter and skewed circumferentially by several percent. Aperture diameter, radial location, circumferential spacing, and axis orientation may be modified, as desired, to suit a particular application.

In order to support and provide for positive longitudinal location of the bearing member flange 48, a flange 66 extends radially inwardly from the cap wall 60. The mating flange 66 includes a generous external radius slightly smaller than that of the bearing flange 48.

The flange 66 also includes the travel limiting step 134 for the nozzle 118, and the reaction step 128 for the spring element 126. To provide for unrestricted passage of the nozzle 118 therethrough, the flange forms a first aperture 68 having an inner diameter greater than that of the nozzle aperture 62 of the bearing member 44. Also, a common plurality of second apertures 70 are formed by the cap flange 66 to match the shield gas apertures 64 of the bearing member flange 48 in order to provide unrestricted flow of the shield gas therethrough. To preclude problems with aperture registration, the nozzle retainer 132 may be manufactured by first mounting the bearing member 44 to the retaining cap 42 and thereafter, drilling through both flanges 48, 66 to form the apertures 64, 70 simultaneously.

Figure 5A:
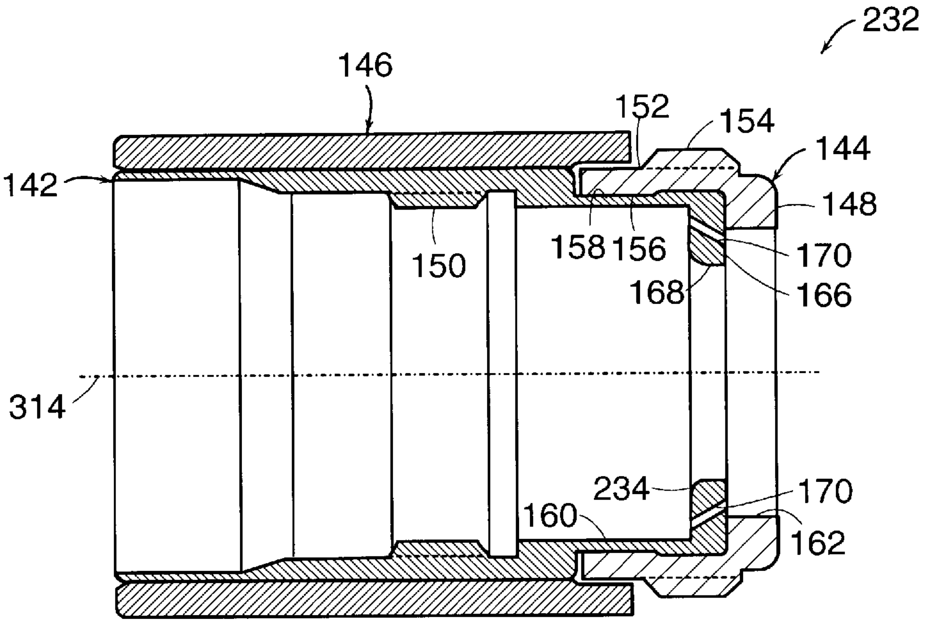
PRIOR ART FIG. 5A
FIG. 5A is a schematic sectional side view of a prior art nozzle retainer.
Figure 5B:
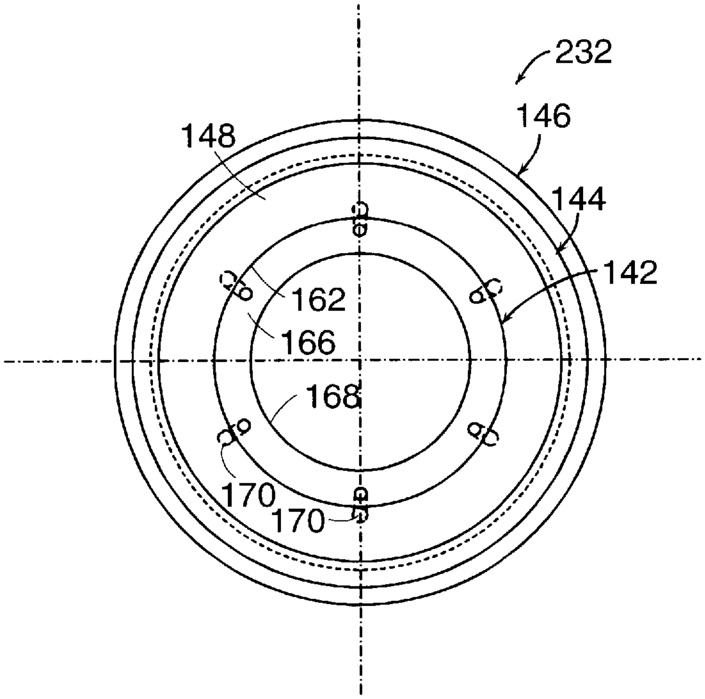
PRIOR ART FIG. 5B
FIG. 5B is a schematic end view of the prior art nozzle retainer depicted in FIG. 5A.
Figure 1B:
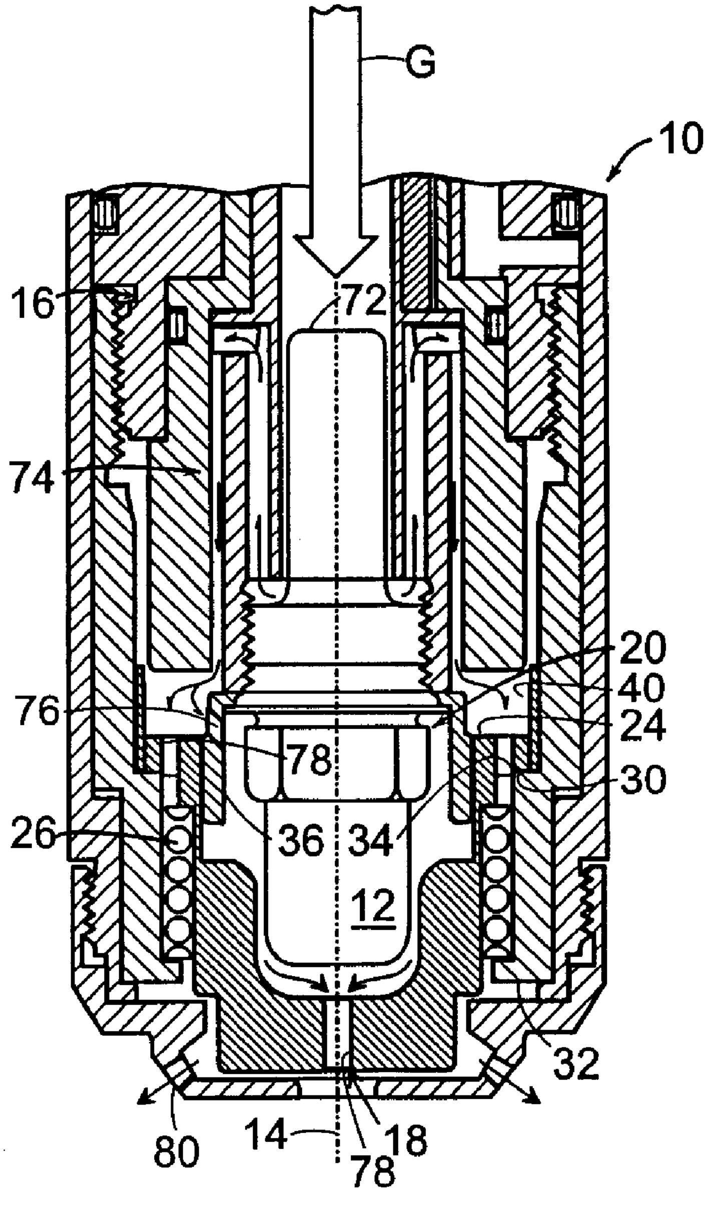
Figure 2A:
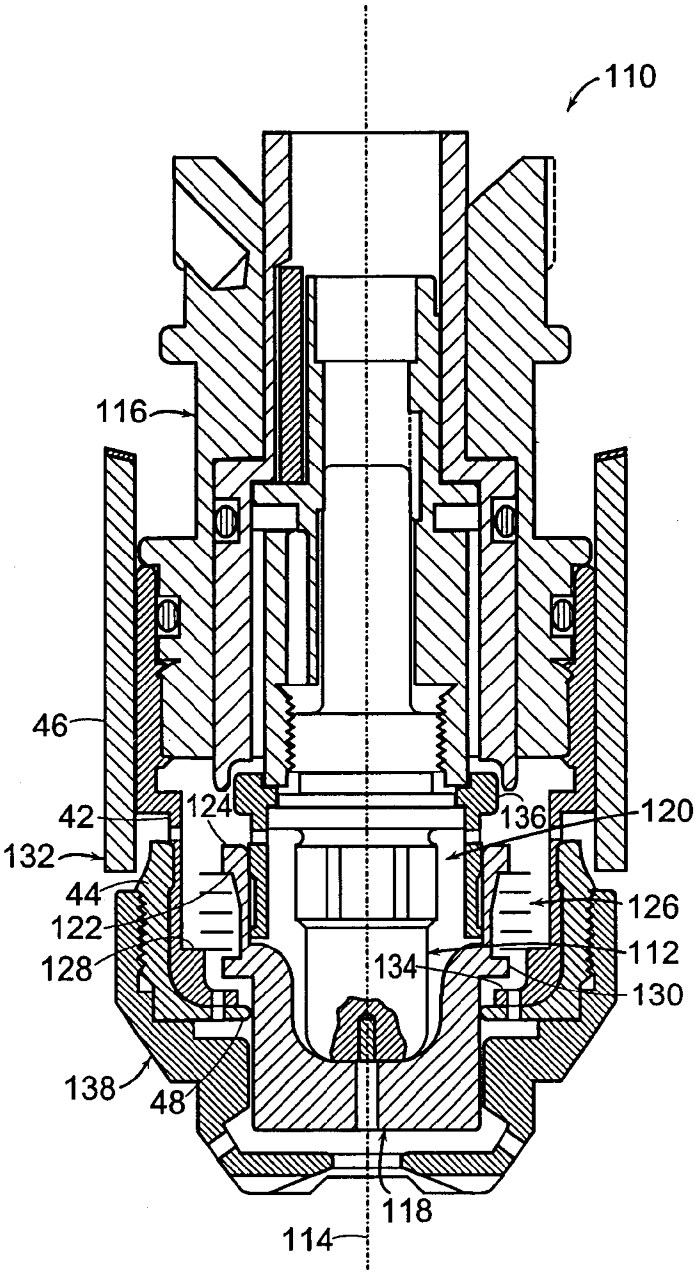
Figure 2B:
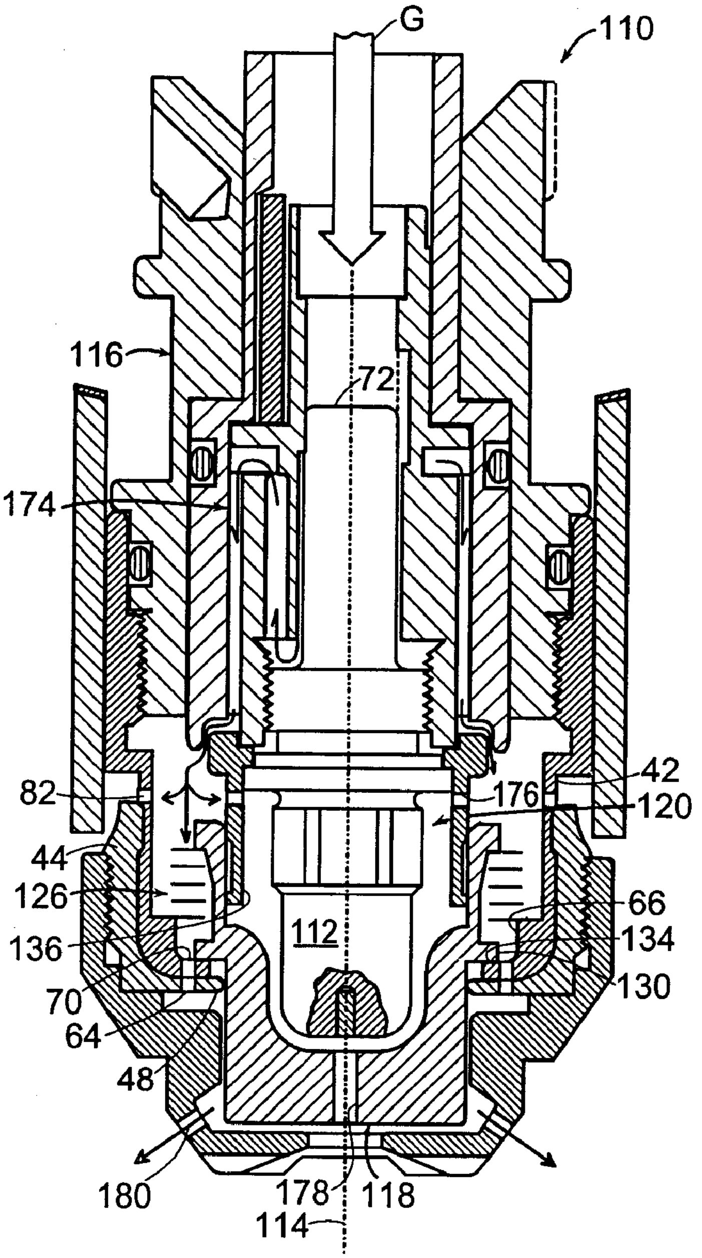
Figure 3A:
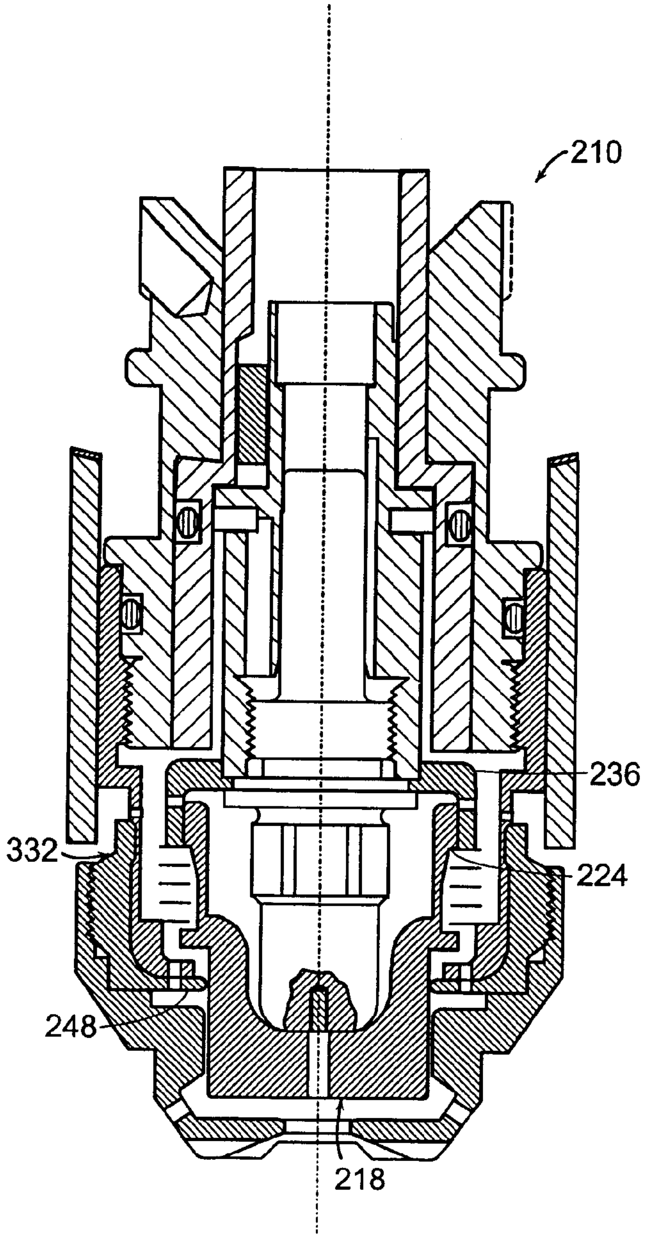
Figure 3B:
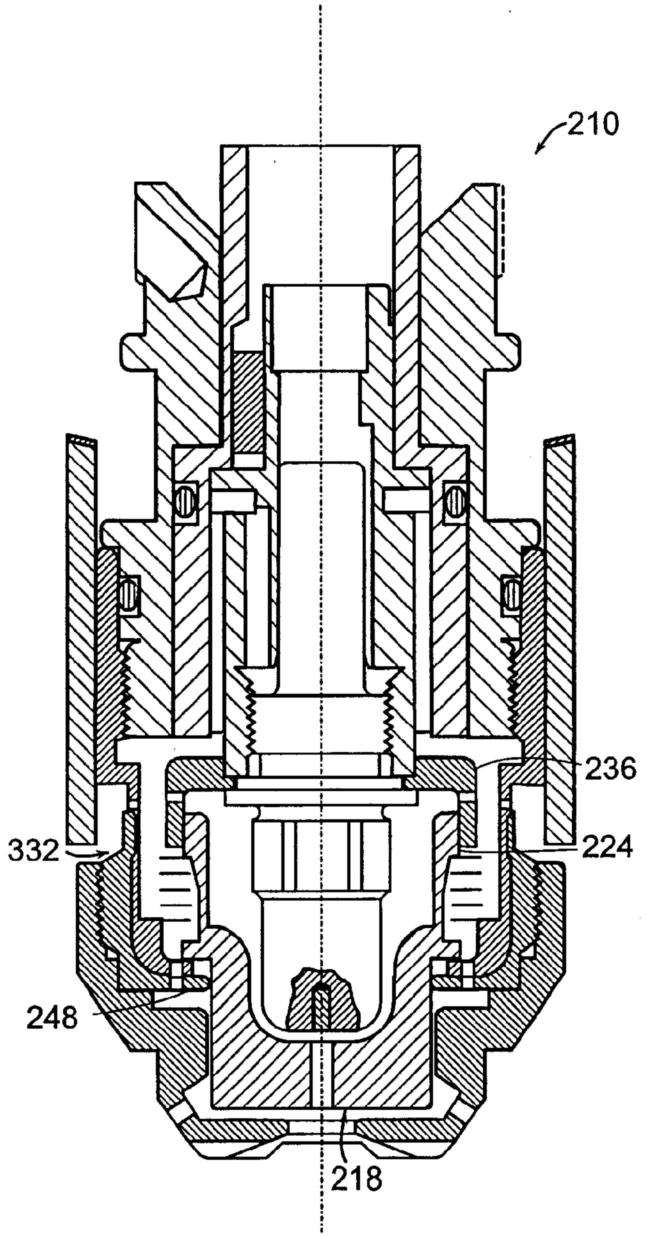
Figure 5A:
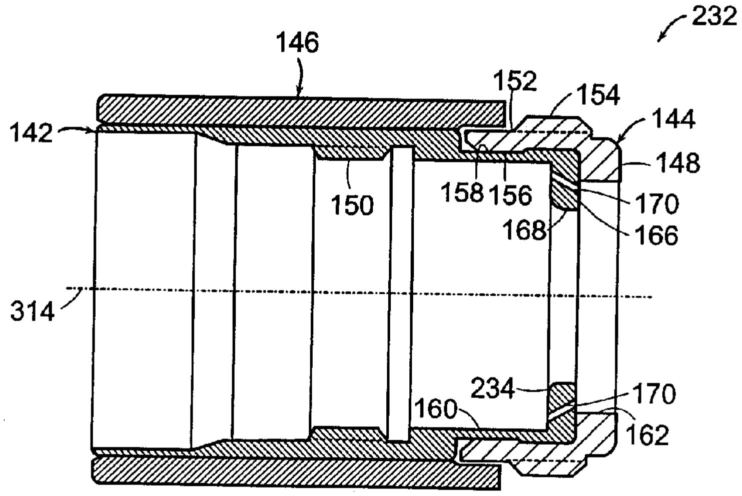
PRIOR ART FIG. 5A

FIGS. 5A and 5B are a schematic sectional side view and a schematic end view, respectively, of a prior art nozzle retainer 232 employed in a shielded plasma arc torch utilizing a fixed, non-translatable nozzle. The nozzle retainer 232 includes a retaining cap 142, a shield mount 144, and an outer sleeve 146 forming an assembly. Each of the cap 142, the mount 144, and the sleeve 146 have first and second ends defining a longitudinal axis 314 of symmetry. The cap 142 is assembled to a torch body along cap threads 150. The mount 144 is manufactured from an electrically insulative material and includes a generally cylindrical annular wall 152 having a radially inwardly directed flange 148 extending therefrom. A sharp internal radius is provided at the junction of the flange 148 and the wall 152. Threads 154 are provided along an exterior portion of the wall 52 for threaded engagement with mating threads of a shield.

The shield mount 144 is mounted to the retaining cap 142 by a contoured radial interference fit. A localized minimum diameter portion 156 of the wall 152 mates with a matching contoured minimum outer diameter portion 158 of an annular wall 160 of the retaining cap 142. The sleeve 146 is made from an electrically insulative material and press fit over the retaining cap 142.

The radial flange 148 of the bearing member 144 forms a first aperture 162 generally centered on the longitudinal axis 214 for clearance. A flange 166 extends radially inwardly from the cap wall 160 forming a first oversized aperture 168 and an aft facing step 234 to merely capture a fixed, non-translatable nozzle. A plurality of second apertures 170 are formed by the cap flange 166 to provide a flow path for shield gas. Each shield gas aperture 170 defines an aperture axis oriented to intersect the longitudinal axis 314. As is best seen in FIG. 5B, the shield gas aperture axes are canted in a radial direction so as not to induce a swirling flow in the shield.

Referring once again to FIG. 1B, a flow of gas, G, is channeled through the body 16 of the torch 10 in a forward direction, first impinging on an aft tailstock 72 of the electrode 12. The gas flow G reverses direction twice through a concentric annular heat exchange configuration shown generally at 74 to cool the electrode 12. Upon exiting the heat exchanger 74, the flow is divided into a first subflow which enters the plasma chamber 20 through a plurality of apertures 76 (solely one of which is depicted) formed in the swirl ring 36 and a second subflow which travels in a forward direction through apertures 78 formed in nozzle flange 30. The first subflow pressurizes the plasma chamber 20, translating the nozzle 18 in a forward direction and providing the gas flow to sustain the plasma arc. The first subflow exits the torch 10 through a nozzle orifice 78. The second subflow travels forward in the annulus formed by the nozzle 18 and the nozzle retainer 32 in which is disposed the spring element 26. The second subflow exits the torch through a plurality of shield apertures 80 to enshroud the plasma arc.

Referring now to FIG. 2B, a flow of gas, G, is channeled through the body 116 of the torch 110 in a forward direction, first impinging on an aft tailstock 172 of the electrode 112. The gas flow G reverses direction twice through a concentric annular heat exchange configuration shown generally at 174 to cool the electrode 112. Upon exiting the heat exchanger 174, the gas flow G is divided into: (i) a first subflow which enters the plasma chamber 120 through apertures 176 formed in the swirl ring 136; (ii) a second subflow which travels in a forward direction through an annulus formed by the nozzle 118 and the retaining cap 42 in which is disposed the spring element 126; and (iii) a third subflow or remaining flow which passes through a series of vent apertures 82 formed in the wall 60 of the retaining cap 42. The first subflow pressurizes the plasma chamber 120, translating the nozzle 118 in a forward direction and providing the gas flow to sustain the plasma arc. The first subflow exits the torch 110 through a nozzle orifice 178. Translation of the nozzle 118 and abutment of the nozzle flange 130 with the cap step 134 seal the annulus formed by the nozzle 118 and the retaining cap 42 such that the second subflow passes through the shield gas apertures 64, 70 formed in nozzle bearing flange 48 and cap flange 66, respectively. The second subflow exits the torch through a plurality of shield apertures 180 to enshroud the plasma arc. The remaining flow is vented to ambient via vent apertures 82.

Division of the gas flow G into the three constituent flows is controlled by sizing flow passages such as apertures within the torch components to throttle each subflow as desired. For example, the first subflow which pressurizes the plasma chamber 120 and supports the plasma arc is throttled by the nozzle orifice 178 to produce a stable plasma arc, not by the swirl ring apertures 176. A primary function of the swirl ring apertures 176 is to induce a swirling flow within the plasma chamber 120 for facilitating arc stability and control. The second subflow, which provides a shield gas flow, is throttled by contiguous shield gas apertures 64, 70 in the nozzle retainer 132 and not the shield apertures 80. Lastly, the vent apertures 82 in the retaining cap 42 are generally sized sufficiently large so as not to adversely influence the throttling of the plasma arc flow and the shield flow. Accordingly, the volumetric flow rate of the gas flow G through the torch body 116 can be increased as necessary to provide the necessary degree of cooling of the electrode 112 and proximate structure without affecting operation of the torch 110. In the case of the dual split flow of torch 10 in FIG. 1B, an increase in total gas flow G through the torch body 16 to enhance cooling of the electrode 12 can result in excess shield flow which would detrimentally affect torch performance and in extreme cases could quench the plasma arc altogether. With the vented flow configuration of torch 110 in FIG. 2B, excess flow is benign, being vented to ambient. Accordingly, cooling of the electrode 112 with concomitant extension of electrode life can be substantially decoupled from the performance of the torch 110, even though a single gas flow supports all three functions. The vented flow configuration of the torch 110 is not limited to torches employing translatable nozzles, but rather may be employed advantageously in any shielded torch.

Testing was conducted to ascertain the influence of the addition of vent flow on torch performance. Measured performance parameters included maximum cut speed, quantity of dross, lag angle, and cut angle. As is known by those skilled in the art, dross is molten material which has resolidified at the bottom or exit of the kerf, lag angle is an angle of cut measured from top to bottom of the kerf when viewed from a location generally perpendicular to the direction of cut, and cut angle is an angle of cut measured from top to bottom of the kerf when viewed from a location generally collinear with the direction of cut.

Utilizing an unvented shielded torch rated at 80 amperes with eight equi-spaced circumferentially disposed shield apertures 180 each having an equivalent nominal diameter, maximum cut speed was about 20 inches per minute (51 cm/min). By adding four generally circumferentially equi-spaced radial vent apertures 82 to the retaining cap 42 at a common longitudinal location, each having an equivalent nominal diameter, maximum cut speed was increased about 25 percent to about 25 inches per minute (64 cm/min) without detrimental impact on quantity of dross, lag angle, or cut angle. Torch operating parameters were kept substantially constant; however, in order to maintain plasma chamber pressure and subflow constant, the nominal diameter of each shield aperture 180 was reduced slightly so that the flow split pressure in the annulus in which the spring element 126 is located could be maintained substantially constant.

While there have been described herein what are to be considered exemplary and preferred embodiments of the present invention, other modifications of the invention will become apparent to those skilled in the art from the teachings herein. For example, instead of being attached to the nozzle 118, the spring element 126 could be captured between opposed flanges of the nozzle retainer 132. Alternatively, the spring element 126 may be a separate element from both the nozzle 118 and the retainer 132. Additionally, the vent flow may be employed in any shielded torch to decouple cooling of the electrode 112 from plasma chamber and shield gas subflows. The particular methods of manufacture of discrete components and interconnections therebetween disclosed herein are exemplary in nature and not to be considered limiting. It is therefore desired to be secured in the appended claims all such modifications as fall within the spirit and scope of the invention. Accordingly, what is desired to be secured by Letters Patent is the invention as defined and differentiated in the following claims.

What is claimed is:

1. A plasma arc torch comprising:

a torch body having a longitudinally disposed axis;

an electrode mounted in the body and generally aligned with the torch axis;

a translatable nozzle having a longitudinally disposed axis, the nozzle axis and the torch axis being substantially collinear;

a nozzle retainer mounted to the body for capturing the nozzle, the retainer comprising a radially inwardly directed flange forming a first aperture generally centered along the torch axis for radially locating the nozzle; and a spring element disposed between the retainer and the nozzle for compliantly biasing the nozzle in direction of contact with the electrode.

2. The invention according to claim 1 wherein the retainer comprises:

an electrically insulative bearing member including the flange; and an electrically conductive retaining cap comprising a second flange against which the spring reacts.

3. The invention according to claim 2 wherein at least one of the bearing flange and the cap flange forms an aperture passing therethrough, the aperture being radially offset from the torch axis.

4. The invention according to claim 3 wherein both of the bearing flange and the cap flange form respective aligned apertures passing therethrough, the apertures being radially offset from the torch axis.

5. The invention according to claim 4 wherein the aligned apertures define an aperture axis which is oriented substantially skew relative to the torch axis.

6. A method of supporting a translatable nozzle in a plasma arc torch having a longitudinal axis comprising the steps of:

providing a nozzle including a generally cylindrical wall comprising:

an first wall surface defining a generally constant diameter along at least a portion thereof; and an second wall surface defining a generally constant diameter along at least a portion thereof;

providing a first structure for supporting the first wall surface for sliding contact; and providing a second structure for supporting the second wall surface for sliding contact, wherein the respective sliding contact surfaces are longitudinally spaced apart and at least one of the first structure and the second structure further forms an aperture having an axis offset from the torch axis.

7. The invention according to claim 6 wherein the first structure comprises a swirl ring.

8. The invention according to claim 6 wherein the second structure comprises a nozzle retainer.

9. A plasma arc torch bearing member comprising:

a generally cylindrical wall having a first end and a second end defining a longitudinal bearing axis; and a radially inwardly directed flange extending from the wall, the flange forming:

a first aperture generally centered along the bearing axis for radially locating a nozzle movably disposed therethrough; and a second aperture radially offset from the first aperture.

10. The invention according to claim 9 wherein the second aperture defines an aperture axis which is oriented substantially skew relative to the bearing axis.

11. The invention according to claim 9 wherein the flange further forms a plurality of second apertures radially offset from the first aperture.

12. The invention according to claim 11 wherein the plurality of second apertures are formed at a substantially constant radial dimension from the bearing axis and at substantially equi-spaced circumferential locations.

13. The invention according to claim 9 wherein the wall forms an inner diameter which varies as a function of position along the bearing axis.

14. The invention according to claim 9 wherein the flange comprises an electrically insulative material.

15. A plasma arc torch nozzle retainer comprising:

a retaining cap comprising:

a generally cylindrical wall having a first end and a second end defining a longitudinal cap axis; and a radially inwardly directed flange forming a first aperture defining a diameter; and a bearing member mounted to the retaining cap, the bearing member comprising:

a radially inwardly directed flange forming a first aperture defining a diameter for radially locating a nozzle movably disposed therethrough, the bearing flange diameter being less than the cap flange diameter; and a generally cylindrical wall having a first end and a second end defining a longitudinal bearing axis, wherein:

the bearing axis and the cap axis are substantially collinear, the bearing flange forms a second aperture radially offset from the first bearing aperture, and the cap flange forms a second aperture radially offset from the first cap aperture, such that each of the second bearing aperture and the second cap aperture define respective aperture axes which are substantially collinear.

16. The invention according to claim 15 wherein the respective second collinear aperture axes are oriented substantially skew relative to the collinear bearing and cap axes.

17. The invention according to claim 15 wherein:

the bearing flange further forms a plurality of second apertures radially offset from the first bearing aperture; and the cap flange further forms a common plurality of second apertures aligned with the plurality of second bearing apertures.

18. The invention according to claim 15 wherein the bearing wall and the cap wall comprise a radial interference fit along at least a portion thereof.

19. The invention according to claim 15 wherein the bearing flange further comprises an electrically insulative material.

20. The invention according to claim 15 further comprising a generally cylindrical sleeve circumscribing at least a portion of the cap wall, the sleeve comprising an electrically insulative material.

21. A plasma arc torch nozzle retainer comprising:

a retaining cap comprising a generally cylindrical wall;

a bearing member mounted to the retaining cap, the bearing member comprising a radially inwardly directed flange forming a first aperture for radially locating a nozzle movably disposed therethrough and forming a second aperture radially offset from the first aperture; and a generally cylindrical sleeve circumscribing at least a portion of the cap wall, the sleeve comprising an electrically insulative material.

* * * * *

UNITED STATES PATENT AND TRADEMARK OFFICE

CERTIFICATE OF CORRECTION

PATENT NO. : 5,886,315
DATED : March 23, 1999
INVENTOR(S) : Lu et al.

It is certified that error appears in the above-identified patent and that said Letters Patent is hereby corrected as shown below:

The title page showing an illustrated figure, should be deleted and substituted therefor the attached title page.

Delete drawing sheets 2, 3, 4, 5, 6 & 9 and substitute therefor the attached drawing sheets 2, 3, 4, 5, 6 & 9.

Signed and Sealed this

Second Day of September, 2003

JAMES E. ROGAN
*Director of the United States Patent and Trademark Office*

United States Patent [19]

Lu et al.

[11] Patent Number: 5,886,315

[45] Date of Patent: Mar. 23, 1999

[54] BLOW FORWARD CONTACT START PLASMA ARC TORCH WITH DISTRIBUTED NOZZLE SUPPORT

[75] Inventors: Zhipeng Lu, Hanover; Jon Lindsay, West Lebanon; Stephen T. Eickhoff; Michael F. Kornprobst, both of Hanover, all of N.H.

[73] Assignee: Hypertherm, Inc., Hanover, N.H.

[21] Appl. No.: 904,694

[22] Filed: Aug. 1, 1997

[51] Int. Cl.[6] .................... B23K 10/00

[52] U.S. Cl. .................... 219/121.57; 219/75; 219/121.39; 219/121.52; 219/124.01

[58] Field of Search .................... 219/121.54, 121.57, 219/124.01, 121.5, 121.52, 121.39, 121.59, 121.44, 75

[56] References Cited

U.S. PATENT DOCUMENTS

| | | | |
|---|---|---|---|
| 4,521,666 | 6/1985 | Severance, Jr. et al. | 219/121.59 |
| 4,567,346 | 1/1986 | Marhic | 219/121.48 |
| 4,590,334 | 5/1986 | Marhic et al. | 219/121 PM |
| 4,650,956 | 3/1987 | Marhic et al. | 219/121 PY |
| 4,959,520 | 9/1990 | Okada et al. | 219/121.48 |
| 5,083,005 | 1/1992 | Degrihgny | 219/121.52 |

OTHER PUBLICATIONS

*Powermax 800 High Performance Portable Plasma Cutting System catalog;* Hypertherm, Inc.; 4 pages.; (1995).

*Powermax 800 Torch Parts catalog;* Hypertherm, Inc.; 4 pages (Oct. 1995).

*Primary Examiner*—Mark H. Paschall

*Attorney, Agent, or Firm*—Testa, Hurwitz & Thibeault, LLP

[57] ABSTRACT

A translatable nozzle is supported in a contact start plasma arc torch at an aft end by a swirl ring and at a longitudinally spaced forward end by an insulative bearing member of a nozzle retainer. The nozzle is biased into contact with an electrode by a compliant spring element. A pilot arc is formed by first passing current through the electrode and nozzle. Upon pressurization of a plasma chamber formed therebetween, the nozzle is translated forward, compressing the spring element and initiating the pilot arc. The spring element may be maintained integrally with the nozzle to facilitate removal and replacement of the spring element with the consumable nozzle.

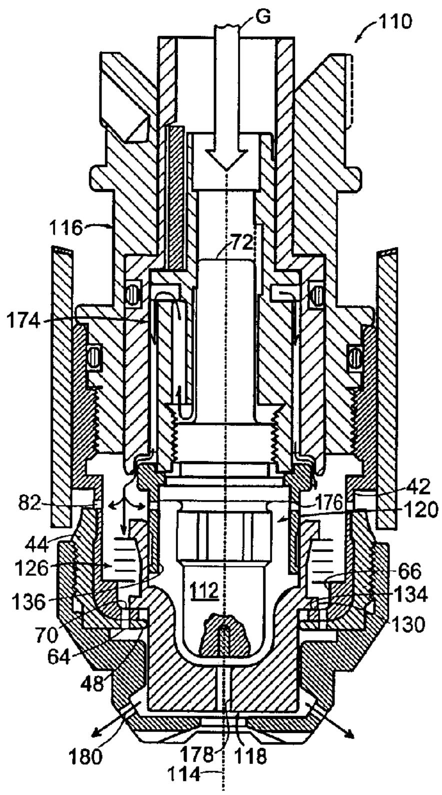

21 Claims, 10 Drawing Sheets